US006785732B1

(12) United States Patent
Bates et al.

(10) Patent No.: US 6,785,732 B1
(45) Date of Patent: Aug. 31, 2004

(54) WEB SERVER APPARATUS AND METHOD FOR VIRUS CHECKING

(75) Inventors: Cary Lee Bates, Rochester, MN (US); Paul Reuben Day, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 781 days.

(21) Appl. No.: 09/605,258

(22) Filed: Sep. 11, 2000

(51) Int. Cl.[7] .............................................. G06F 15/16
(52) U.S. Cl. ........................ 709/232; 713/188; 713/201
(58) Field of Search ................................ 709/225, 226, 709/227, 232, 238; 713/201, 188, 189

(56) References Cited

U.S. PATENT DOCUMENTS

| | | | |
|---|---|---|---|
| 5,832,208 A | 11/1998 | Chen et al. ............ | 305/187.01 |
| 6,088,803 A | 7/2000 | Tso et al. .................... | 713/201 |
| 6,199,103 B1 * | 3/2001 | Sakaguchi et al. .......... | 709/206 |
| 6,609,196 B1 * | 8/2003 | Dickinson et al. .......... | 713/154 |
| 6,615,241 B1 * | 9/2003 | Miller et al. ................. | 709/206 |
| 6,650,890 B1 * | 11/2003 | Irlam et al. .............. | 455/412.1 |
| 6,701,440 B1 * | 3/2004 | Kim et al. ................... | 713/201 |

FOREIGN PATENT DOCUMENTS

WO    WO0028420    5/2000    .......... G06F/11/00

* cited by examiner

*Primary Examiner*—Zarni Maung
(74) *Attorney, Agent, or Firm*—Martin & Associates, LLC; Derek P. Martin

(57) ABSTRACT

A web server computer system includes a virus checker and mechanisms for checking e-mails and their attachments, downloaded files, and web sites for possible viruses. When an e-mail message contains a detected virus, the message is discarded, and both the sender and recipient are informed via e-mail that the message contained a virus. When an e-mail attachment contains a detected virus, the attachment is deleted, and the e-mail message without the attachment is sent to the web client, along with a message explaining that the e-mail message had an attachment that was automatically deleted because it had a virus. When a downloaded file contains a virus, the downloaded file is deleted, and an error message is sent to the web client to inform the web client that the requested file had a virus. When a requested web site (i.e., Uniform Resource Locator (or URL)) has been labeled as a source for a known virus, a message is sent to the web client stating that a virus may have been downloaded from that URL. In addition, if the requested URL has not been labeled as a source for a known virus, but it contains links that have been so labeled, the web page is processed before being sent to the user to identify those potentially dangerous links. In this manner a web server can perform virus checking of different types of information real-time as the information is requested by a web client. In addition, a web client may also request that the server perform virus checking on a particular drive on the web client. If this case, the web server may receive information from the web client drive, scan the information for viruses, and inform the web client whether any viruses were found. In the alternative, the web server may download a client virus checker to the web client and cause the client virus checker to be run on the web client. The preferred embodiments thus allow a virus checker on a web server to dynamically scan incoming data, and to scan web clients coupled to the web server, thereby eliminating the need for virus checking software to be installed on each web client.

3 Claims, 11 Drawing Sheets

| User List ||
|---|---|
| User Name | Virus Checking Preferences 128 |
| george123 | Verify e-mail always<br>Verify downloaded files always<br>Verify web pages by request<br>Use Norton Antivirus |
| fred246 | Verify e-mail always<br>Verify downloaded files on request<br>Allow checking for viruses on client on request<br>Use Norton Antivirus |

FIG. 5

User Virus Checking Preferences

Verify e-mail:
○ Never
○ By request
● Always

Verify downloaded files:
○ Never
○ By request
● Always

Verify web pages:
○ Never
● By request
○ Always

☐ Check here to sign up for e-mail notification
　☐ Send me information on latest viruses
　☐ Send me reminders and strategies Select virus checking program:
[Norton Antivirus ▼] 610

☐ Check here to allow local virus checking on your computer at your request

OK  Cancel

FIG. 6

WEB SERVER APPARATUS AND METHOD FOR VIRUS CHECKING

BACKGROUND OF THE INVENTION

1. Technical Field

This invention generally relates to web pages and more specifically relates to a web server apparatus and method that provides information to web clients.

2. Background Art

Since the dawn of the computer age, computer systems have evolved into extremely sophisticated devices, and computer systems may be found in many different settings. The widespread proliferation of computers prompted the development of computer networks that allow computers to communicate with each other. With the introduction of the personal computer (PC), computing became accessible to large numbers of people. Networks for personal computers were developed that allow individual users to communicate with each other.

One significant computer network that has recently become very popular is the Internet. The Internet grew out of this proliferation of computers and networks, and has evolved into a sophisticated worldwide network of computer system resources commonly known as the "world-wide-web", or WWW. A user at an individual PC or workstation (referred to as a "web client") that wishes to access the Internet typically does so using a software application known as a web browser. A web browser makes a connection via the Internet to other computers known as web servers, and receives information from the web servers that is rendered to the web client. One type of information transmitted from a web server to a web client is known as a "web page", which is generally formatted using a specialized language called Hypertext Markup Language (HTML). Another type of information transmitted from a web server to a web client is e-mail messages and any files or other information attached to those messages. Yet another type of information transmitted from a web server to a web client is files that may be downloaded from a web site.

Computer viruses have emerged as a very real threat to data in today's computer systems. Recently, the "I Love You" virus infected computer systems all over the world, and destroyed vast amounts of data, particularly image files. Virus checking application programs are currently available for checking viruses on individual computers. Norton Antivirus and McAfee VirusScan are two examples of commercially-available virus checkers. Known virus checkers run on a single computer system, such as a web server or a web client. These virus checkers typically are run at the user's request to determine whether there are any viruses on any specified drive or file. In addition, some virus checkers can be configured to automatically check incoming data in a downloaded file before allowing the file to be stored on the computer system. For example, Norton Antivirus allows a user to select an option that checks all downloaded files before passing them on to the user's computer system. However, all of the known virus checkers operate on one particular computer system, and there is currently no way for a virus checker on one system to check for viruses on a different computer system.

With the growing popularity of the Internet, an ever-increasing number of web clients are connected to web servers. A web server acts as a conduit through which information is passed to numerous web clients. If a virus checker could be implemented on a web server to check all information flowing through it, the need for local virus checking at individual web client workstations would be greatly reduced. Without a way for a web server to check information flowing to web clients for viruses, the current methods for virus checking will continue to allow viruses to spread and cause considerable damage before they can be controlled.

DISCLOSURE OF INVENTION

According to the preferred embodiments, a web server computer system includes a virus checker and mechanisms for checking e-mails and their attachments, downloaded files, and web sites for possible viruses. When an e-mail message contains a detected virus, the message is discarded, and both the sender and recipient are informed via e-mail that the message contained a virus. When an e-mail attachment contains a detected virus, the attachment is deleted, and the e-mail message without the attachment is sent to the web client, along with a message explaining that the e-mail message had an attachment that was automatically deleted because it had a virus. When a downloaded file contains a virus, the downloaded file is deleted, and an error message is sent to the web client to inform the web client that the requested file had a virus. When a requested web site (i. e., Uniform Resource Locator (or URL)) has been labeled as a source for a known virus, a message is sent to the web client stating that a virus may have been downloaded from that URL. In addition, if the requested URL has not been labeled as a source for a known virus, but it contains links that have been so labeled, the web page is processed before being sent to the user to identify those potentially dangerous links. In this manner a web server can perform virus checking of different types of information real-time as the information is requested by a web client. In addition, a web client may also request that the server perform virus checking on a particular drive on the web client. In this case, the web server may receive information from the web client drive, scan the information for viruses, and inform the web client whether any viruses were found. In the alternative, the web server may download a client virus checker to the web client and cause the client virus checker to be run on the web client. The preferred embodiments thus allow a virus checker on a web server to dynamically scan incoming data, and to scan web clients coupled to the web server, thereby eliminating the need for virus checking software to be installed on each web client.

The preferred embodiments also provide a virus information database that allows sharing information relating to viruses with other web servers and with appropriate authorities, such as law enforcement agencies. A user feedback feature also allows a client to inform the web server of information regarding a new virus. Another feature of the preferred embodiments is that senders of viruses are notified when the web server detects a virus, thus helping to inhibit the proliferation of the virus.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and:

FIG. 5 is a block diagram of the user list of FIGS. 1 and 3;

FIG. 6 is a diagram of a display window for a user to define virus checking preferences for the web server in FIGS. 1 and 3;

BEST MODE FOR CARRYING OUT THE INVENTION

Overview

The method and apparatus of the present invention has particular applicability to a web client receiving information from a web server via the Internet. For those individuals who are not familiar with the Internet, a brief overview of relevant Internet concepts is presented here.

Figure 2:
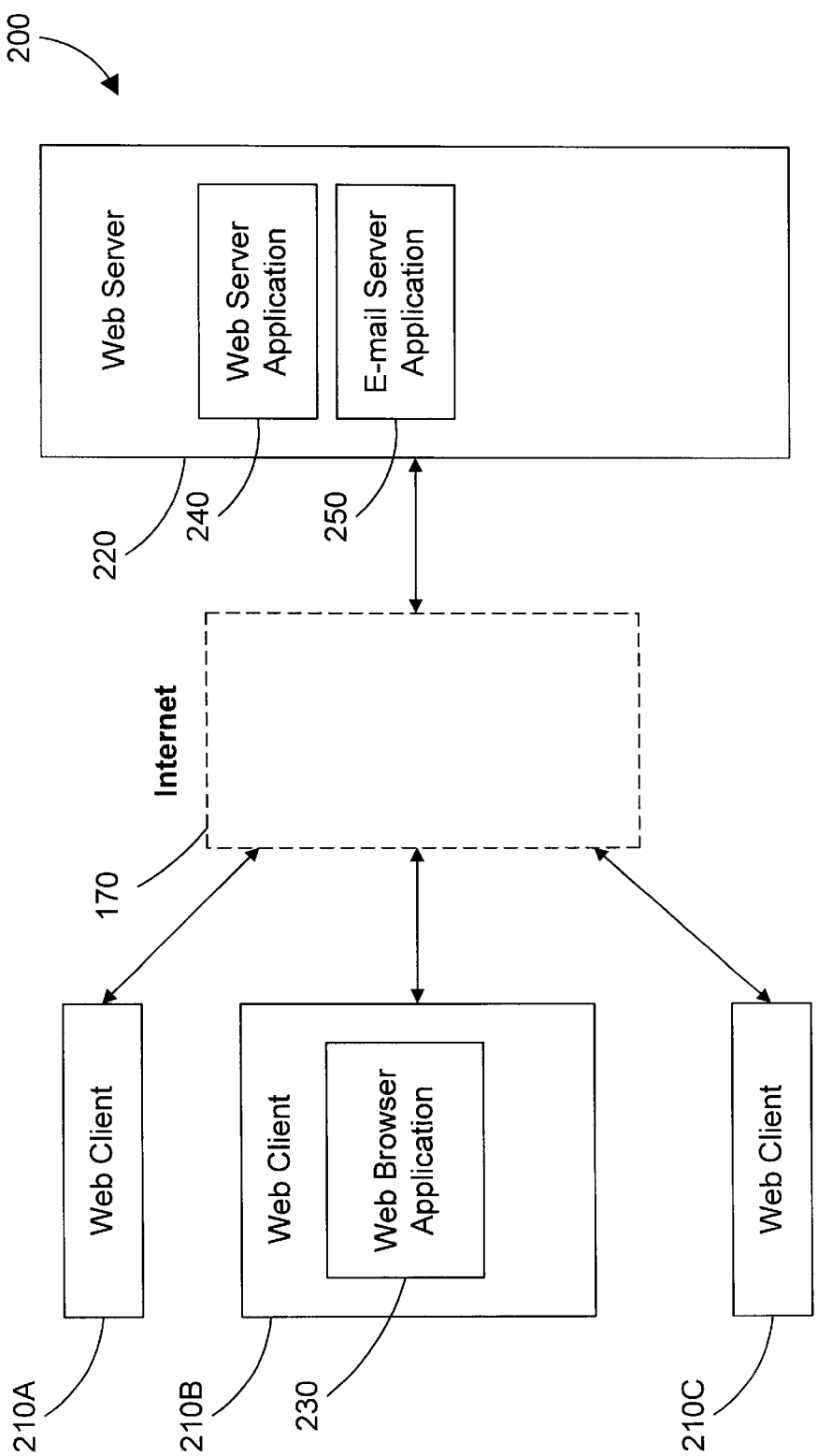
FIG. 2 is a block diagram of a prior art apparatus for accessing information on a web server by one or more web clients.
Figure 3:
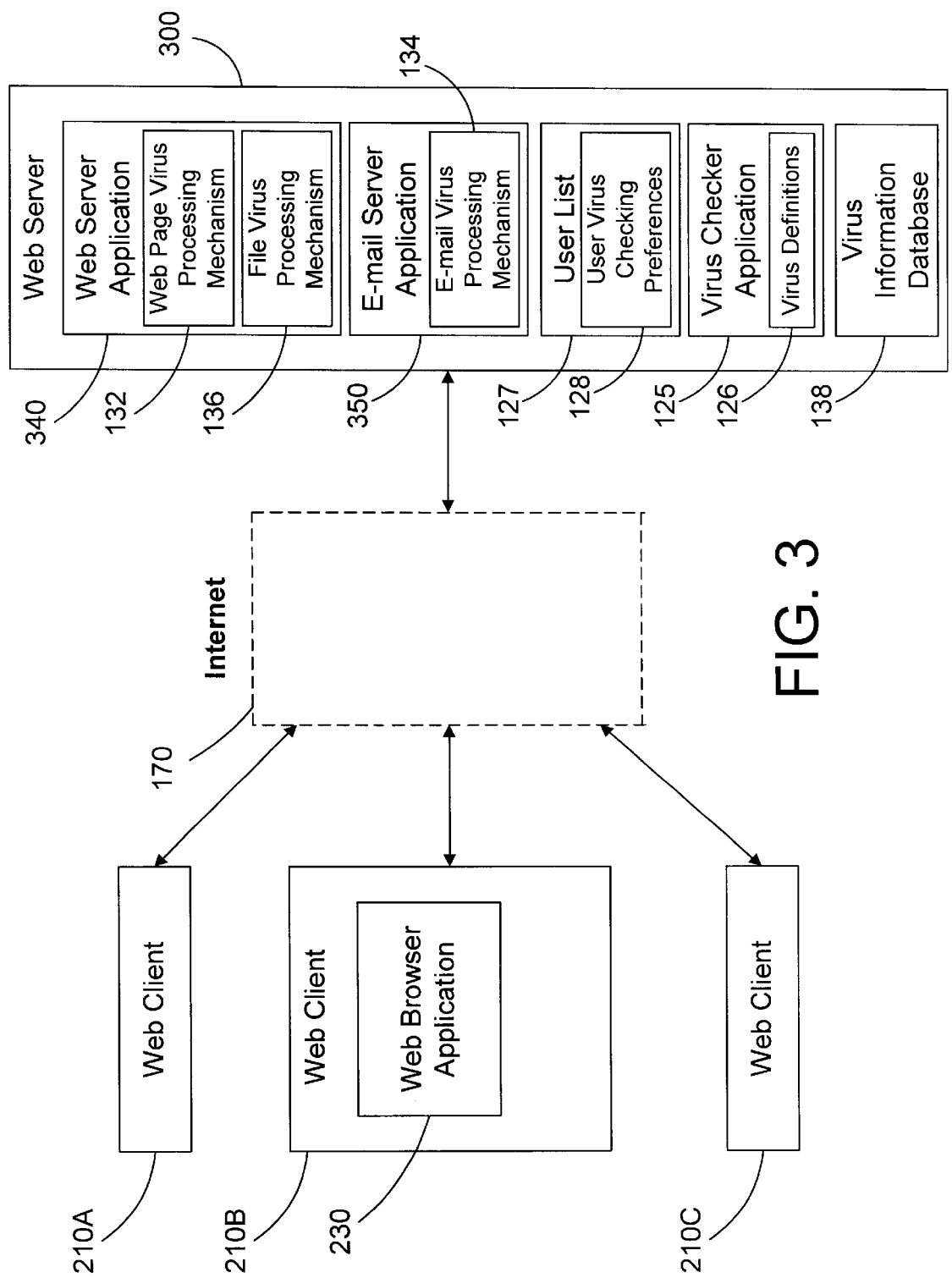
FIG. 3 is a block diagram of an apparatus in accordance with the preferred embodiments.

An example of a typical Internet connection is shown by the apparatus 200 in FIG. 2. A user that wishes to access information on the Internet 170 typically has a computer workstation referred to as a "web client" (such as web client 210B) that executes an application program known as a web browser 230. A web client, represented by 210A, 210B, and 210C in FIGS. 2 and 3, is referred to herein as a web client 210. Under the control of web browser 230, web client workstation 210 sends a request for a web page over the Internet 170. Web page data can be in the form of text, graphics and other forms of information, collectively known as MIME data. Each web server on the Internet has a known address, termed the Uniform Resource Locator (URL), which the web browser uses to connect to the appropriate web server. Because web server 220 can contain more than one web page, the user will also specify in the address which particular web page he wants to view on web server 220. A web server computer system 220 executes a web server application 240, monitors requests, and services requests for which it has responsibility. When a request specifies web server 220, web server application 240 generally accesses a web page corresponding to the specific request, and transmits the web page via the Internet to the web browser 230 on the user's workstation 210. Known web browsers include Netscape Communicator and Microsoft Internet Explorer.

A web page may contain various types of data, including MIME data. Most web pages include visual data that is intended to be displayed on the monitor of web client 210. Web pages are generally written in Hypertext Markup Language (HTML). When web server 220 receives a web page request, it will send the requested web page in HTML form across the Internet 170 to the requesting web browser 230. Web browser 230 understands HTML and interprets it and outputs the web page to the monitor (or display) of user workstation 210. This web page displayed on the user's screen may contain any suitable MIME data, including text, graphics, audio elements, video elements, and links (which reference addresses of other web pages). These other web pages (i.e., those represented by links) may be on the same or on different web servers. The user can invoke these other web pages by clicking on these links using a mouse or other pointing device. This entire system of web pages with links to other web pages on other servers across the world is known as the "World Wide Web".

In addition to web pages, web servers may also provide other types of information to a web client. For example, a web server 220 may execute an e-mail server application 250, which receives e-mails from its registered users and sends those e-mails on towards their ultimate destination. In addition, e-mail server application 250 receives e-mail messages for all of its registered users, and routes each message to the appropriate user.

Another type of data that may be passed through a web server to a web client is a downloaded file. A file may be downloaded using many different methods. For example, a user may click on a link on a web page that causes a file to be loaded. Some files may be contained in or referenced by web pages, and may be automatically downloaded when a page that references it is downloaded. Of course, other suitable methods exist for downloading a file, and the preferred embodiments herein expressly extend to any and all methods for transferring any type of information between a web server and a web client.

Detailed Description

A web server apparatus and method in accordance with the preferred embodiments automatically screens information requested by a web client for viruses according to defined user virus checking preferences, and takes appropriate action when a virus is found or when there is a threat of a URL containing a virus or a reference to a virus. In addition, the preferred embodiments allow a user to perform virus scans on a web client drive, such as a disk drive or a CD-ROM drive, using the virus checker that resides on the web server. This configuration allows one virus checker on the web server to protect each web client connected to it from viruses without the need for virus checking software to be installed on each web client. Because one virus checker on the web server can service a large number of web clients, the process of updating the virus checker to recognize new viruses is greatly simplified compared to updating virus checkers on each web client. In addition, the likelihood of a web server spreading viruses is greatly reduced when information received by the web server is checked for viruses before forwarding the information to a web client.

Figure 1:
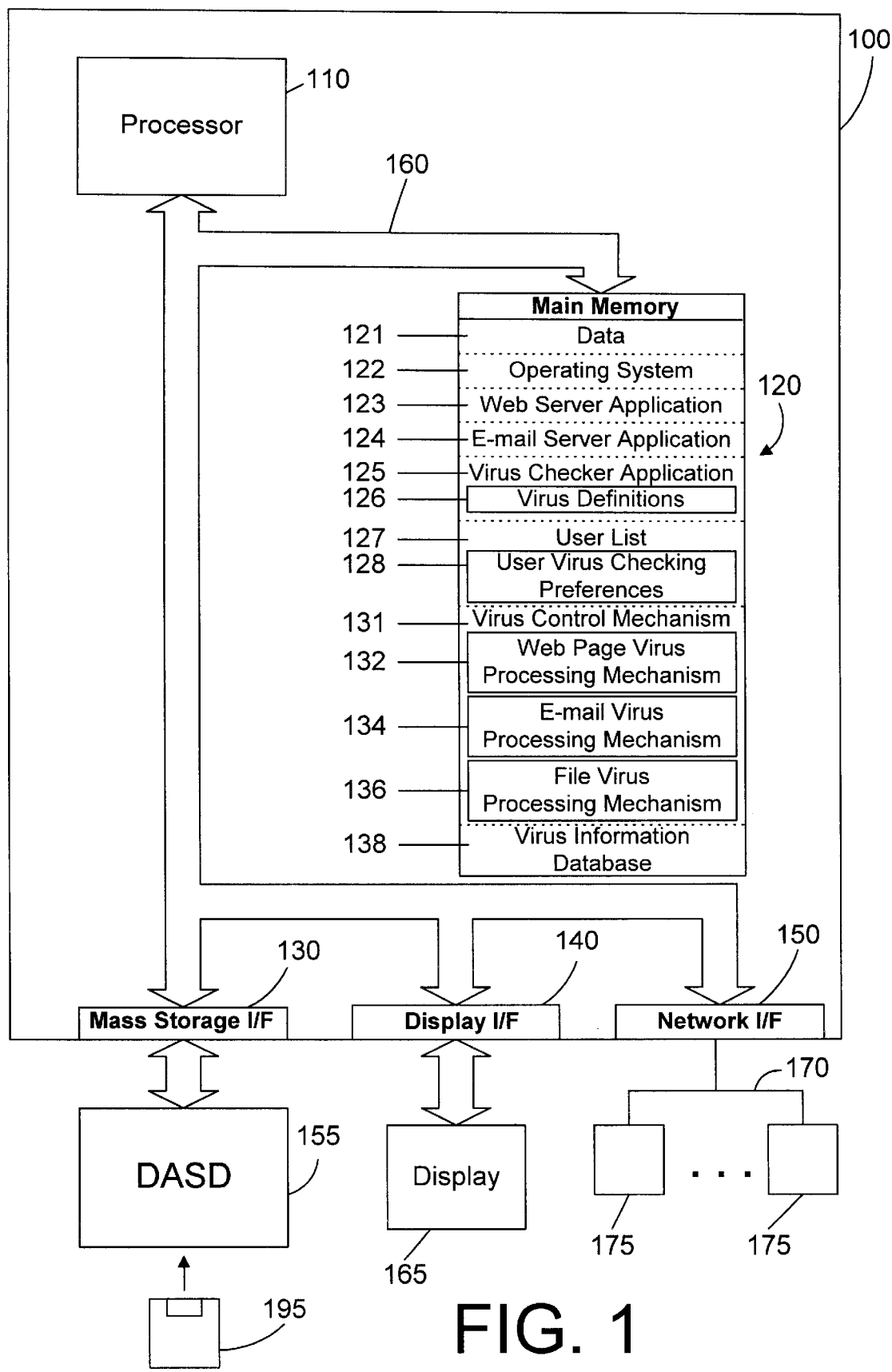
FIG. 1 is a block diagram of an apparatus in accordance with the preferred embodiments.

Referring to FIG. 1, one specific implementation of a web server computer system in accordance with the preferred embodiments is an AS/400 computer system 100. Computer system 100 comprises a processor 110 connected to a main memory 120, a mass storage interface 130, a display interface 140, and a network interface 150. These system components are interconnected through the use of a system bus 160. Mass storage interface 130 is used to connect mass storage devices (such as a direct access storage device 155) to computer system 100. One specific type of direct access storage device is a floppy disk drive, which may store data to and read data from a floppy diskette 195.

Main memory 120 in accordance with the preferred embodiments contains data 121; an operating system 122; a web server application 123; an e-mail server application 124; a virus checker application 125 with associated virus definitions 126; a user list 127 with associated user virus checking preferences 128; a virus control mechanism 131 that includes a web page virus processing mechanism 132, an e-mail virus processing mechanism 134, and a file virus processing mechanism 136; and a virus information database 138. Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while the items 121–128 and 131–138 are shown to reside in main memory 120, those skilled in the art will recognize that these items are not necessarily all completely contained in main memory 120 at the same time. It should also be noted that the term "memory" is used herein to generically refer to the entire virtual memory of computer system 100.

Data 121 represents any data that serves as input to or output from any program in computer system 100. Operating system 122 is a multitasking operating system known in the industry as OS/400; however, those skilled in the art will appreciate that the spirit and scope of the present invention is not limited to any one operating system. Web server application 123 is a computer program that monitors requests for information, and services requests for which it has responsibility. In other words, when a web client requests a web page that is stored on a hard disk drive (e.g., 155) on web server 100, the web server application 123 delivers the requested web page to the requesting web client. The e-mail server application 124 is a computer program that sends and receives e-mail messages and their attachments. When a web client that is a registered user of the e-mail server application 124 wants to send an e-mail message, the message is sent from the web browser to the web server that contains the e-mail server application 124, which then sends the message on towards its intended recipient.

Virus checker application 125 is a computer program that detects the presence of viruses that are defined in its virus definitions 126. Note that virus definitions 126 may include specific viruses, as well as particular activity (such as writing to the boot record of a hard disk drive) that may signal a virus. Virus checker application 125 is similar to the known virus checkers that are commercially available today. Note, however, that virus checker application 125 must be able to run in a command mode rather than using a graphical user interface that requires user input, because the web server application 123, e-mail server application 124, and virus control mechanism 131 need to be able to initiate a virus scan using virus checker application 125 and receive results of the virus check without user intervention.

The user list 127 is a list of users that are registered to use the virus control mechanism 131. The user list 127 includes a list of users, and their corresponding virus checking preferences 128 that determine how the web server application 123, e-mail server application 124, and/or virus control mechanism 131 screen incoming information for viruses.

Virus control mechanism 131 includes the web page virus processing mechanism 132, e-mail virus processing mechanism 134, and file virus processing mechanism 136. Web page virus processing mechanism 132 checks a web client's request for a web page to determine whether the web page or any contained links were the source of a virus in the past. The virus information database 138 is a database of virus information that relates to web server computer system 100. Note that virus information database 138 may be a local database, or may be a large centralized database that includes the virus information for many web servers, such as a centralized database that could be accessed via a web site. Virus information database 138 may include a specification of known viruses, along with statistics for which ones have been encountered and when. In addition, virus information database 138 may include a list of web sites that are known to contain viruses, or from where viruses were downloaded. A web site that contains a virus or from which a virus was downloaded is referred to herein as a "bad" URL. Using the virus information database 138, web page virus processing mechanism 132 can warn a web client that has requested a web page at a bad URL, or that has requested a web page that includes links to a bad URL.

E-mail virus processing mechanism 134 processes e-mails received by e-mail server application 124 from users in the user list 127 that are to be sent out to designated recipients, and processes e-mails received by e-mail server application 124 from other e-mail servers. E-mail virus processing mechanism 134 preferably scans both incoming and outgoing e-mail messages for viruses. If a virus is detected in the e-mail itself, the e-mail message is deleted, and an e-mail message is sent to the sender and intended recipient notifying both that the e-mail contained a virus. If a virus is detected in an attachment to an e-mail message, the attachment is deleted, and the message without the attachment is sent to the intended recipient, along with a message from the e-mail server application 124 that states that the attachment was deleted before delivery because it contained a virus. This message could be included by modifying the original e-mail message, or could be sent in a separate e-mail message.

File virus processing mechanism 136 processes files that a web client has requested to download to determine if a requested file has a virus. If the downloaded file contains a virus, the file is deleted, and the requesting web client is notified that the download could not be completed because the file contained a virus. If the downloaded file has no virus, it is passed on to the requesting web client. Note that in the discussion above, the deletion of an e-mail message, attachment, or file is with respect to the intended recipient, but the e-mail message, attachment or file could be stored for analysis or for communication to the appropriate authorities.

Each of the web page virus processing mechanism 132, the e-mail virus processing mechanism 134, and the file virus processing mechanism 136 preferably operate according to the user virus checking preferences 128. If the user so desires, any or all of these mechanisms may automatically check for viruses without user intervention, making these virus checks nearly transparent to the user. If no viruses are detected, the only indication to the user of the automatic virus checking that is occurring may be a slightly longer time to receive the requested information. Of course, if a virus is detected, the user will be provided with notification of the virus and may be presented with options for dealing with the virus.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 130, display interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. Display 165 may be a simple display device, such as a monitor, or may be a fully programmable workstation, and is used to allow system administrators and users to communicate with computer system 100.

Network interface 150 allows computer system 100 to send and receive data to and from any network the computer system may be connected to. This network may be a local area network (LAN), a wide area network (WAN), or more specifically the Internet 170 (as shown in FIG. 3). Suitable methods of connecting to the Internet include known analog and/or digital techniques, as well as networking mechanisms that are developed in the future. Many different network protocols can be used to implement a network. These protocols are specialized computer programs that allow computers to communicate across a network. TCP/IP (Transmission Control Protocol/internet Protocol), used to communicate across the Internet, is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks (e.g., 195 of FIG. 1) and CD ROM, and transmission type media such as digital and analog communications links.

FIG. 1 illustrates that mechanisms 132, 134 and 136 may all reside in a virus control mechanism 131 that is separate from web server application 123 and e-mail server application 124. In the alternative, these mechanisms could be separated and incorporated within the web server application and e-mail application. One such implementation is shown in web server 300 in FIG. 3, which shows that the web page virus processing mechanism 132 and file virus processing mechanism 136 may reside within a web server application 340 in accordance with the preferred embodiments, and that the e-mail virus processing mechanism 134 may reside within the e-mail server application 350 in accordance with the preferred embodiments. This configuration allows implementing the functions of these mechanisms 132, 134 and 136 within the web server application 340 and the e-mail server application 350, rather than providing a separate, dedicated software application 131 as shown in FIG. 1.

Figure 4:
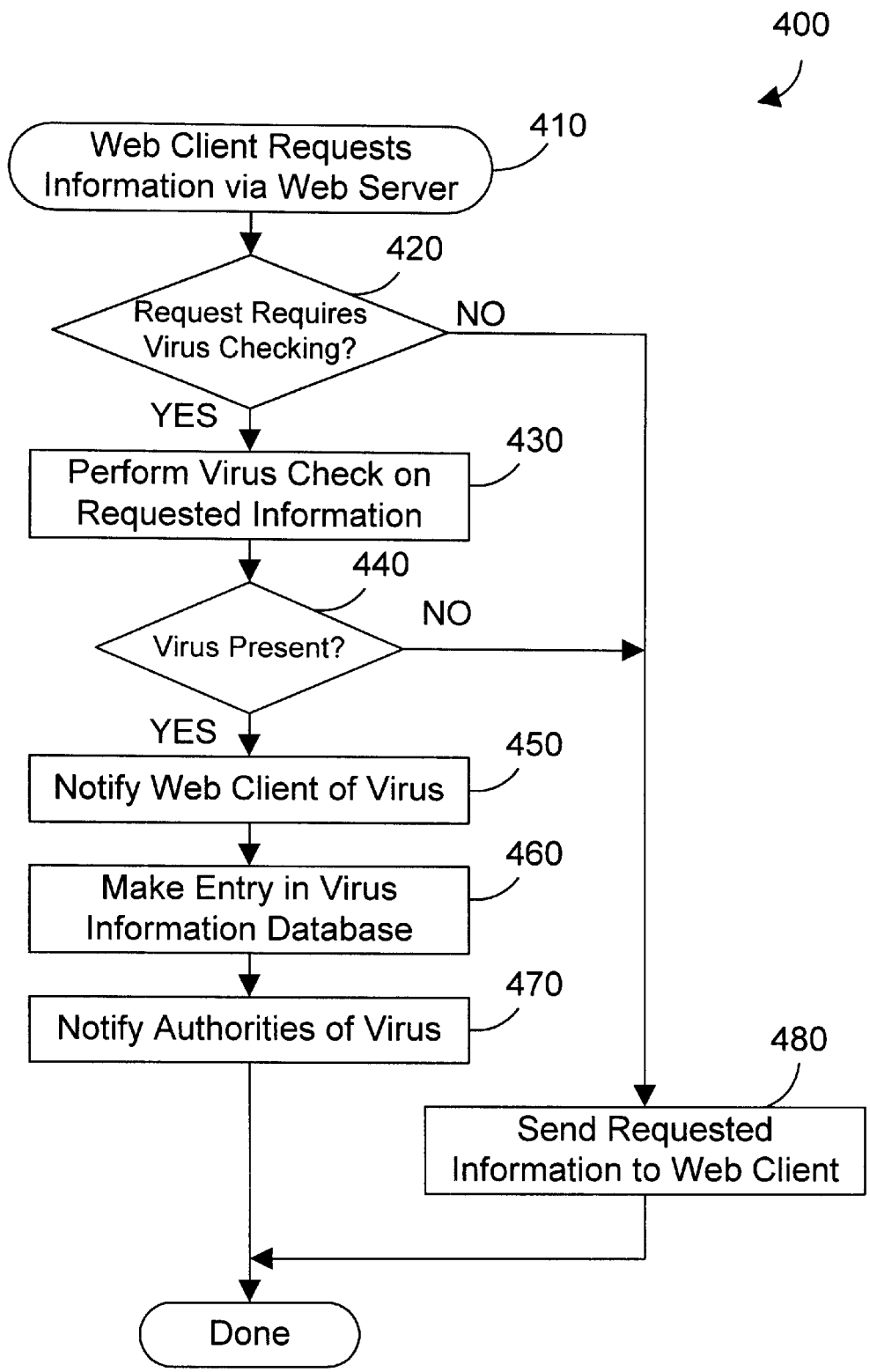
FIG. 4 is a flow diagram of a method for a web server to scan requested information for a virus before serving that information to a web client in accordance with the preferred embodiments.

Referring now to FIG. 4, a method 400 in accordance with the preferred embodiments allows a virus checker on a web server to automatically check e-mail messages, web pages, and downloaded files for viruses before passing these on to a web client. Method 400 begins when a web client requests information that normally would flow through the web server to the web client (step 410). If the request does not require virus checking (step 420=NO), the requested information is sent to the web client (step 480). If the request requires virus checking (step 420=YES), a virus check is performed on the requested information (step 430). If no virus is found (step 440=NO), the requested information is sent to the web client (step 480). If a virus is found (step 440=YES), the web client is notified of the virus (step 450), and an entry is made in the virus information database (step 460) regarding the name of the virus, type, when detected, etc. Finally, the appropriate authorities may be notified of the virus (step 470). The term "appropriate authorities" is a broad term that encompasses anyone who may need to know about the occurrence of a virus, including a network administrator of a local area network, a web site administrator, a contact person in a virus detection company, and appropriate law enforcement officials, such as local, state, federal, and international law enforcement agencies.

Step 420 in FIG. 4 determines whether a request requires virus checking. One suitable way to perform step 420 in accordance with the preferred embodiments is to provide a user list that specifies virus checking preferences for each user. One specific implementation of a user list 127 is shown in FIG. 5, and includes a user name and corresponding virus checking preferences 128 that are preferably set by the individual users, but could also be set according to system defaults or overrides. FIG. 5 shows that a hypothetical user that has the user name of george 123 has virus checking preferences that specify that all e-mails should be automatically checked for viruses, that all downloaded files should be automatically checked for viruses, that web sites may be checked upon explicit request of the user, and that Norton Antivirus is the virus checker to be used. Another hypothetical user has the user name of fred 246, who has virus checking preferences 128 that specify that all e-mail should be automatically checked for viruses, that all downloaded files may be checked upon explicit request of the user, that virus checking on the user's web client may be performed upon explicit request of the user, and that Norton Antivirus is the virus checker to be used.

The virus checking preferences 128 for a particular user may be setup by the web server sending a web page or other message to the user via the web client. One suitable example of a sample web page for setting up user virus checking preferences is shown as a display window 600 in FIG. 6. The user may click on radio buttons to determine whether e-mail, downloaded files, and web pages are never checked, checked by explicit request of the user, or always checked automatically for viruses before the web server delivers these items to the user via the web client. In addition, the user may sign up for e-mail notification that includes information on the latest viruses and reminders and strategies for virus protection and detection. A drop-down box 610 is provided to allow the user to specify which virus checker is used to perform the virus checks. FIG. 6 shows that the user has selected Norton Antivirus as the desired virus checking program. Note that the drop-down box may contain many different selections, including the names of many different virus checker applications, a "default" selection, and a selection that tells the web server to determine which virus checker is best for the particular type of information being checked. In addition, display window 600 allows the user to perform local virus checking on the web client computer system using a special client version of the selected virus checking program. When the user has entered the desired preferences in the display window 600, the user clicks on the OK button 620, which causes the user virus checking preferences to be stored in the user list 127. If the user decides to not specify virus checking preferences, the user clicks on the cancel button 630, which cancels the setting up of user virus checking preferences. The specific selections in the display window 600 of FIG. 6 correspond to the virus checking preferences 128 for the user with the user name of george 123 in FIG. 5.

Figure 7:
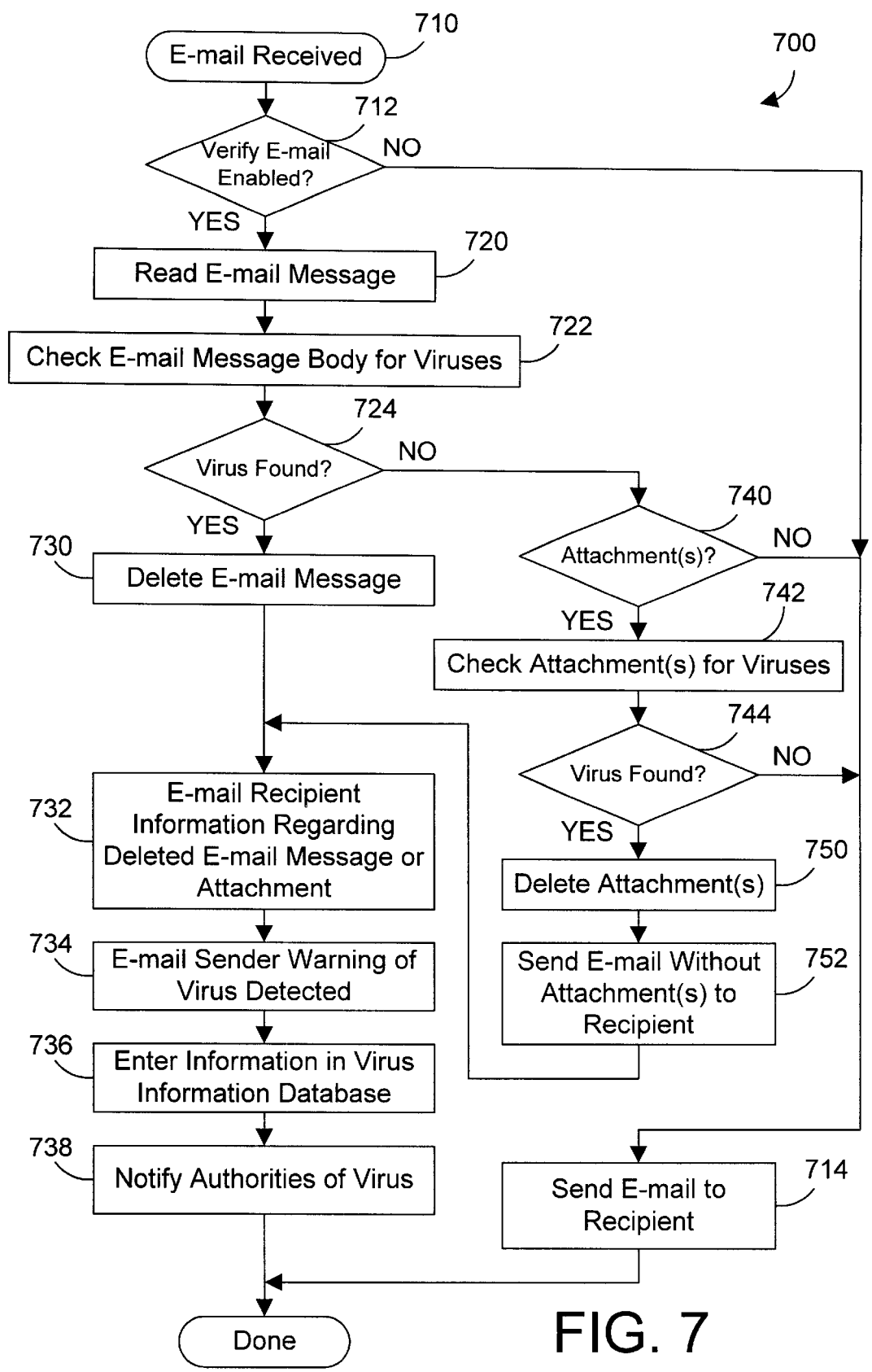
FIG. 7 is a flow diagram of a method performed by the e-mail virus processing mechanism 134 in FIGS. 1 and 3 in accordance with the preferred embodiments.

Referring back to FIGS. 1 and 3, each of mechanisms 132, 134 and 136 perform different functions. One suitable method in accordance with the preferred embodiments for the e-mail processing mechanism 134 is illustrated as method 700 in FIG. 7. Method 700 begins when an e-mail message is received that is intended for one of the users in the user list 127 (step 710). If the virus checking of e-mail messages is not enabled in the user virus checking preferences 128 for the user that is the intended recipient of the e-mail message (step 712=NO), the e-mail is sent to the recipient (step 714). On the other hand, if virus checking of e-mail messages is enabled in the user virus checking preferences 128 for the intended recipient (step 712=YES), the e-mail virus processing mechanism reads the e-mail message (step 720), and checks the e-mail message body for viruses (step 722) using the selected virus checker application. Note that the term "e-mail message body" includes all parts of the e-mail other than attachments, including the fields for sender and recipient, subject line, main portion of message, etc. If no viruses are found (step 724=NO), and there are no attachments to the e-mail message (step 740=NO), the e-mail message is sent to the recipient (step 714). If a virus is found (step 724=YES), the e-mail message is deleted (step 730), and a separate e-mail is sent to the intended recipient of the e-mail informing the recipient that the deleted e-mail message contained a virus and was automatically deleted (step 732). In addition, any other information regarding the virus-infected e-mail message could be sent to the intended recipient in step 732 as well. Next, method 700 e-mails the sender of the e-mail message that included the virus to inform the sender that they sent a virus (step 734). This step is particularly significant because it prevents a user from repeatedly and unknowingly sending out a virus as part of an e-mail message. Next, information regarding the virus is entered into the virus information database (step 736). If this is the first time this web server has detected this particular virus, step 736 preferably makes a new entry in virus information database 138 with pertinent information regarding the virus. If the web server has seen this particular virus before, step 736 preferably updates an existing entry in virus information database 138. Note that the information in virus information database 138 may include any pertinent information regarding the virus including, without limitation, its size in bytes, where the virus came from, when the virus was detected, the location of each detection, etc. Next, method 700 notifies the appropriate authorities regarding the virus (step 738). As stated above, the authorities notified can include any human being or computer that has a need to know about computer viruses.

If no virus was found in the e-mail message body (step 724=NO), but there is one or more attachments to the message (step 740=YES), all attachments are checked for viruses (step 742). If no virus is found (step 744=NO), the e-mail message and any attachments are sent to the recipient (step 714). If a virus is found (step 744=YES), the infected attachment or attachments are deleted (step 750), and the e-mail message without the infected attachment or attachments are sent to the intended recipient (step 752). At this point method 700 e-mails the recipient regarding the deleted attachment (step 732), e-mails the sender a warning that a virus was detected in the e-mail message (step 734), enters appropriate information into the virus information database (step 736), and notifies the appropriate authorities of the virus (step 738). Method 700 thus succeeds in automatically detecting viruses in an e-mail message and its attachments when the user's virus checking preferences specify that e-mails are to be checked for viruses. If the virus checking preferences specify that e-mail messages are always verified for viruses, the answer to step 712 for that user is always YES, and the e-mail message and any attachments will automatically be checked each time an e-mail message is received. In the alternative, if the virus checking preferences specify that e-mail message may be verified upon request of the user, the answer to 712 is NO unless the user has explicitly asked to check a particular e-mail message for viruses, at which time the answer to step 712 becomes YES due to the user enabling the virus check by explicitly requesting that the check be performed. While method 700 applies to e-mail messages received by e-mail server application 124 that specify a registered user as the recipient (i.e., for incoming mail), the preferred embodiments also extend to virus checking of e-mail messages and their attachments that are sent by registered users to others (i.e., in outgoing mail).

Figure 8:
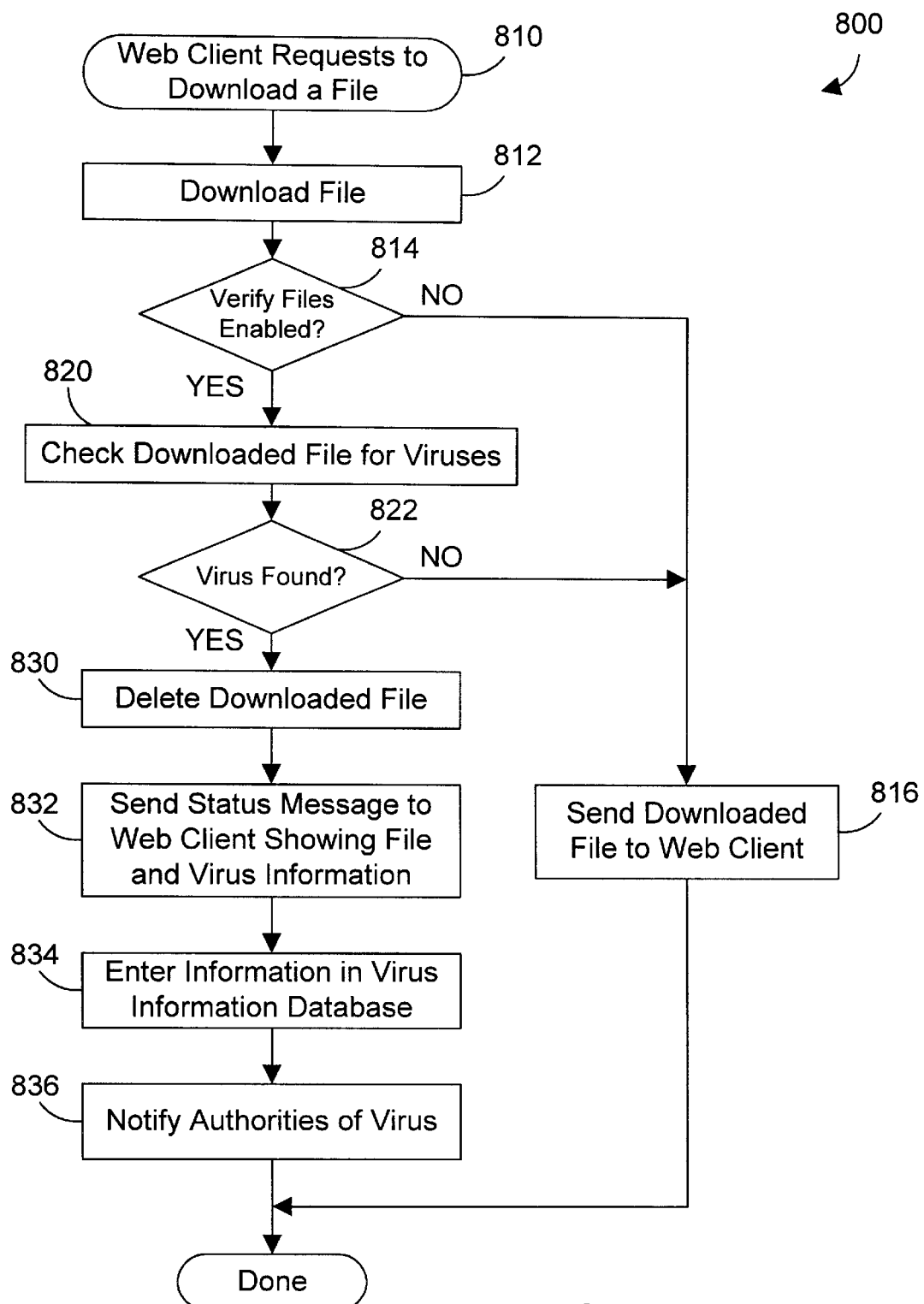
FIG. 8 is a flow diagram of a method performed by the file virus processing mechanism 136 in FIGS. 1 and 3 in accordance with the preferred embodiments.

One suitable method in accordance with the preferred embodiments for the file virus processing mechanism 136 in FIGS. 1 and 3 is illustrated as method 800 in FIG. 8. Method 800 begins when a client requests to download a file (step 810). The file can be any suitable file, such as an application, a text file, an audio file, a video file, or any other file that is capable of being downloaded. The file is first downloaded to the web server (step 812), and method 800 then determines whether the virus checking of downloaded files is enabled (step 814). If not (step 814=NO), the downloaded file is sent to the web client (step 816). If virus checking for downloaded files is enabled (step 814=YES), the file that was downloaded in step 812 is checked for viruses (step 820). If no virus was found during the virus check (step 822=NO), the downloaded file is sent to the web client (step 816). If a virus is found in the downloaded file (step 822=YES), the file is deleted (step 830), and a status message is sent to the web client showing the information on the file and its contained virus that was deleted (step 832). Information about the file and its virus is then entered into the virus information database (step 834), and appropriate authorities are then notified of the virus (step 836).

Figure 9:
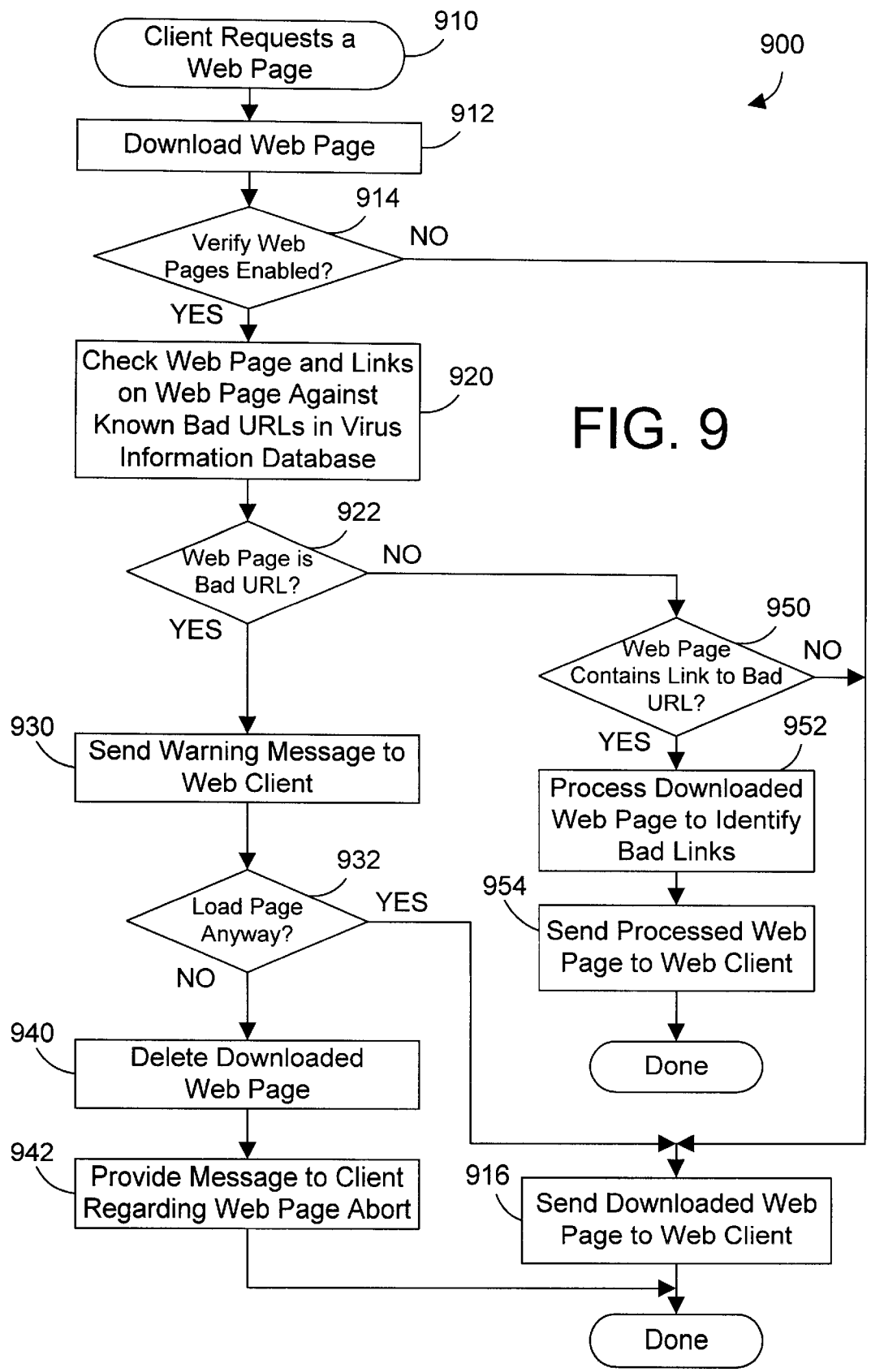
FIG. 9 is a flow diagram of a method performed by the web page virus processing mechanism 132 in FIGS. 1 and 3 in accordance with the preferred embodiments.

One suitable method in accordance with the preferred embodiments for the web page virus processing mechanism 132 in FIGS. 1 and 3 is illustrated as method 900 in FIG. 9. Method 900 begins when a web client requests a web page (step 910). The requested web page is then downloaded (step 912) to the web server. If the checking of viruses in web pages is not enabled (step 914=NO), the web page is sent to the client (step 916). If, however, the checking of web pages for viruses is enabled (step 914=YES), the uniform resource locator (URL) for the web page and for all links on the web page are compared to a list of known URLs in the virus information database 138 that were previously sources for viruses (step 920). If the URL of the web page itself is listed as bad (step 922=YES), a warning message is sent to the web client (step 930), which preferably informs the user that the requested web page may be the location of a virus, and asks if the user wants to continue to download the page anyway.

If the user selects to download the page anyway (step 932=YES), the web page is sent to the client (step 916). If the user selects to not download the page (step 932=NO), the downloaded web page is deleted (step 940) and a message is provided to the web client stating that the loading of the web page was aborted (step 942).

If the web page URL is not bad (step 922), method 900 next checks to see if the web page contains links to any bad URLs (step 950). If not (step 950=NO), the web page is sent to the web client (step 916). If the web page contains one or more links to bad URLs (step 950=YES), the downloaded web page is processed to identify the bad links (step 952), and the processed web page is sent to the web client (step 954). One suitable example would highlight the bad links in a particular color, or provide a text bubble message that warns the user that the link may be or have been the source of a virus.

Figure 10:
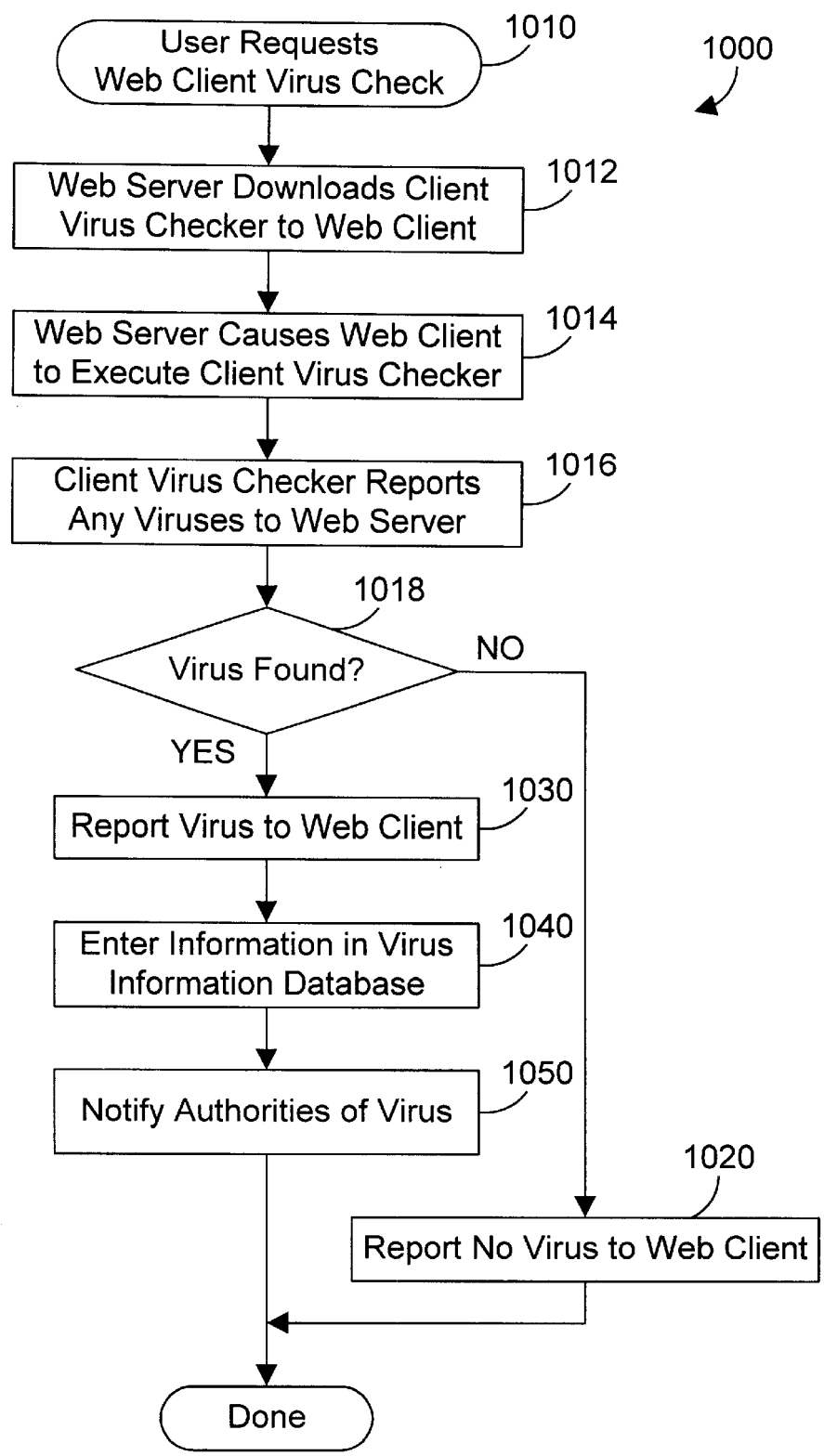
FIG. 10 is a flow diagram of a method for performing a virus check on a web client at the request of a user in accordance with the preferred embodiments.

Referring now to FIG. 10, a method. 1000 in accordance with the preferred embodiments allows a web server to download a special client copy of a virus checker program for execution on the web client to check for local viruses. Method 1000 begins when a user requests a virus check on the user's web client workstation (step 1010). In response, the web server downloads a client virus checker to the web client (step 1012). The web server then causes the web client to execute the client virus checker (step 1014). The client virus checker then reports the existence of any viruses to the server (step 1016). If no virus was found (step 1018=NO), a message reporting no viruses is sent from the web server to the web client (step 1020). If a virus was found (step 1018=YES), a message reporting the virus is sent to the client (step 1030), the virus information is entered into the virus information database (step 1040), and the appropriate authorities are notified of the virus (step 1050). Method 1000 thus allows a user to perform local virus checks using software downloaded from the web server, thereby eliminating the need for virus checking software to be installed on each web client, and offloading at the web server the burden of performing virus checking on the web clients.

Figure 11:
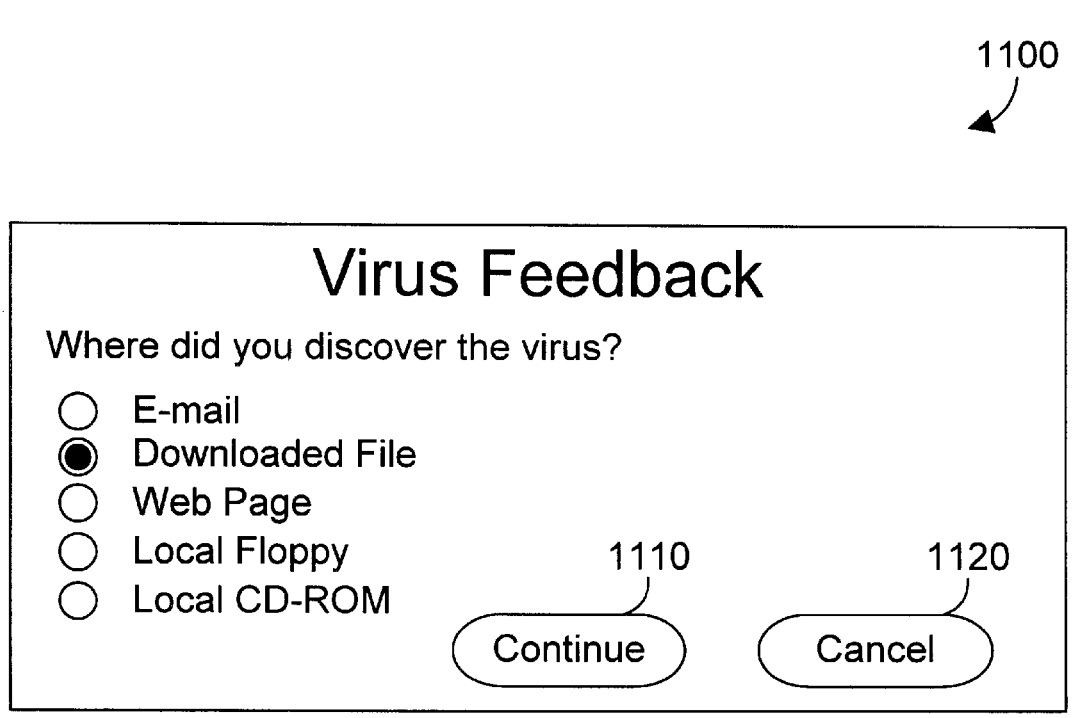
FIG. 11 is a diagram of a display window that may be displayed to a user to define a virus that is not recognized by the virus checker or the virus information database.

Another aspect of the present invention is the ability to inform the web server of a virus that the user may encounter, from either an external source, such as a disk drive or a CD-ROM drive, or a virus that was not detected by the web server. In this case the user may enter information regarding a virus into a virus feedback form. Display window 1100 in FIG. 11 shows a display that may be presented to a user to input information regarding a virus. Display window 1100 prompts the user to indicate the source of the virus. The user may cancel the virus feedback operation by clicking on the cancel button 1120. For the example in FIG. 11, we assume the user discovered a virus in a downloaded file, and wants to inform the web server of the URL that was used to download the virus. The user thus clicks on the "Downloaded File" radio button, and clicks on the continue button 1110. At this point another display window appears, prompting the user for other information relating to the virus. In this particular example, the next display screen would preferably allow the user to enter the URL from which the file with the virus was downloaded. If the e-mail radio button in display window 1100 were selected when the continue button 1110 is clicked, one or more display windows would then follow that allow the user to enter the sender of the e-mail, and whether the virus was in the subject line, message body, attachment, etc. In short, each selection in display window 1100 will cause another display window to be displayed with the continue button 1110 is clicked. The preferred embodiments extend to any mechanism for a user to provide feedback about a virus to the web server.

Figure 12:
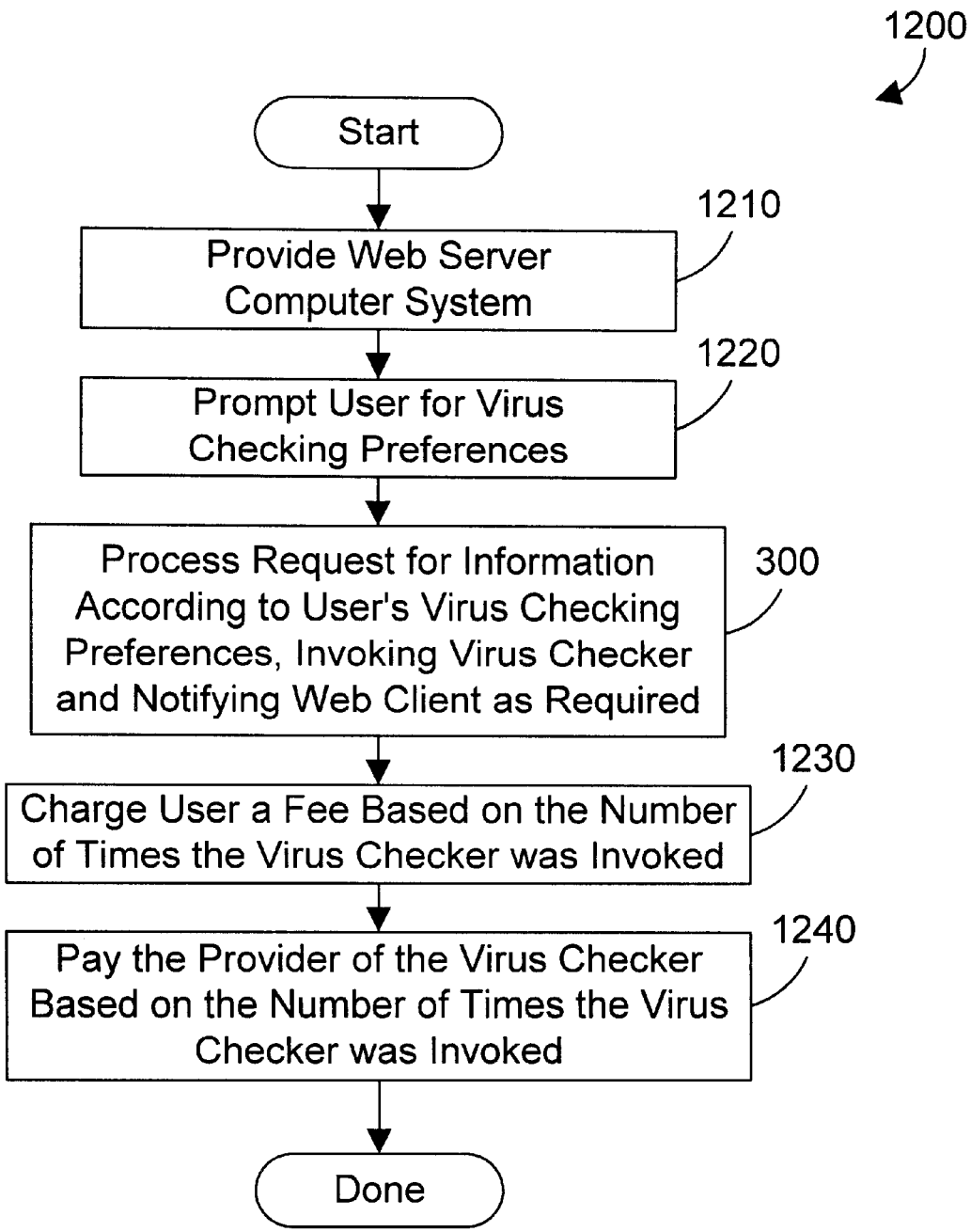
FIG. 12 is a flow diagram of a method for doing business in accordance with the preferred embodiments.

The preferred embodiments also include a method for doing business. Referring to FIG. 12, a method 1200 for doing business begins by providing a web server computer system, such as computer system 100 in FIG. 1 and 300 in FIG. 3. Next, a user is prompted for virus checking preferences (step 1220), which allow the user to setup any suitable preferences for virus checking of information that flows through the web server, as well as information on the user's web client. The next step is to process any request for information according to the user's virus checking preferences, invoking the virus checker and notifying the web client as required (step 300). Note that step 300 in FIG. 12 represents method 300 in FIG. 3. Steps 1210, 1220 and 300 are the core steps to the method for doing business in accordance with the preferred embodiments. The virus checking service may be included in a flat monthly rate charged to a user by an internet service provider (ISP) that provides the web server. The virus checking capability may be offered as part of the regular monthly fee to distinguish the ISP's service from the competition. In the alternative, the virus checking may be charged to the user based on the number of times the virus checker application on the server was invoked on behalf of the user (step 1230). In addition, the provider of the virus checker application on the web server may be paid according to the number of times the virus checker was invoked (step 1240). Neither of steps 1230 nor 1240 are critical to the method of doing business in FIG. 12, but may be included if desired. Of course, other business models are possible as well, such as charging the user according to the number to times the virus checker actually detects and stops a virus, or paying the provider of the virus checker application based on the number of times a virus is detected. The preferred embodiments expressly extend to any and all methods for charging the user (or not) for the virus checking on the web server, and for paying the provider of the virus checker software for the use of the virus checker on the web server.

One of the significant features of the preferred embodiments is the presence of a virus information database 138, as shown in FIGS. 1 and 3. Note that the virus information database 138 is different than the virus definitions 126 used by the virus checker application 125. Virus information database 138 is a repository of information concerning detected viruses, including the number of times the virus was detected, the time of detection, the origin of the virus, etc. Having this information available to the web server computer system allows the web server to log virus-related information and perform analysis on that information as needed. For example, when a virus in an e-mail is detected, the sender of the e-mail may be recorded in the virus information database 138. If the user sends a virus a second time, the user may be labeled in the virus information database as a user that has a history of sending viruses. This could result in the sender being notified that the web server is not accepting e-mails from the sender for a period of time due to excessive e-mails with viruses. The sender can thus be "branded" as a source of viruses, allowing the web server computer system to take any suitable action based on that knowledge.

In another example, if a virus is detected in an e-mail message or its attachment, the e-mail virus processing mechanism could not only delete the infected message or attachment, but could delete other messages from the same sender that are similar (e.g., in size or attachment name) to the deleted message or attachment without explicitly performing virus checks on these similar messages.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

We claim:

1. A web server computer apparatus comprising:
   (A) a processor;
   (B) a memory coupled to the processor;
   (C) a network interface coupled to the processor and coupled via a network to a plurality of web clients;
   (D) a plurality of web pages residing in the memory;
   (E) a user list residing in the memory, the user list including user virus checking preferences for at least one user in the user list;
   (F) a web server application residing in the memory and executed by the processor, the web server application having a plurality of addresses corresponding to the plurality of web pages, the web server application servicing requests for the plurality of web pages, the web server application including:
      (F1) a web page virus processing mechanism residing in the memory and executed by the processor, the web page virus processing mechanism determining whether an address requested by a web client has been used previously to access a virus before delivering information at the requested address to the web client;
      (F2) a file virus processing mechanism residing in the memory and executed by the processor, the file virus processing mechanism determining whether a file requested by a web client contains a virus before delivering the requested file to the web client;
   (G) an e-mail server application residing in the memory and executed by the processor, the e-mail server application having a plurality of e-mail addresses for which it has responsibility, the e-mail server application processing incoming e-mail messages to the plurality of e-mail addresses and processing outgoing e-mail messages from the plurality of e-mail addresses, the e-mail server application including:
      (G1) an e-mail virus processing mechanism residing in the memory and executed by the processor, the e-mail virus processing mechanism determining whether an e-mail message and any attachments to the e-mail message contain a virus before passing the e-mail message to a specified web client;
   (H) a virus information database coupled to the processor that stores information regarding at least one virus that is used by the web page virus processing mechanism, the file virus processing mechanism, and the e-mail virus processing mechanism;
   (I) a mechanism that notifies at least one authority when a virus is detected; and
   (J) a mechanism that downloads a client version of a virus checker application to a web client and causes the client version of the virus checker application to be executed on the web client to check for viruses on the web client.

2. The apparatus of claim 1 wherein the information regarding the at least one virus includes an address from which a virus has been accessed, and an e-mail address of a sender that sent a virus.

3. The apparatus of claim 1 further comprising a user feedback mechanism residing in the memory and executed by the processor, the user feedback mechanism allowing a user to input information regarding a virus to the web server application and to the e-mail server application.

* * * * *